United States Patent
Takahashi

(10) Patent No.: US 9,346,337 B2
(45) Date of Patent: May 24, 2016

(54) AIR CONDITIONING DEVICE FOR VEHICLE

(75) Inventor: Yasufumi Takahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 210 days.

(21) Appl. No.: 14/001,430

(22) PCT Filed: Feb. 24, 2012

(86) PCT No.: PCT/JP2012/001269
§ 371 (c)(1),
(2), (4) Date: Aug. 23, 2013

(87) PCT Pub. No.: WO2012/114767
PCT Pub. Date: Aug. 30, 2012

(65) Prior Publication Data
US 2013/0333406 A1    Dec. 19, 2013

(30) Foreign Application Priority Data

Feb. 24, 2011 (JP) ................. 2011-037882

(51) Int. Cl.
*B60H 1/00* (2006.01)
*B60H 1/22* (2006.01)
(Continued)

(52) U.S. Cl.
CPC ........ *B60H 1/00007* (2013.01); *B60H 1/00057* (2013.01); *B60H 1/00921* (2013.01); *B60H 1/22* (2013.01); *B60H 2001/00135* (2013.01); *B60H 2001/00178* (2013.01); *F25B 13/00* (2013.01);
(Continued)

(58) Field of Classification Search
CPC ........... B60H 1/00007; B60H 1/00921; B60H 1/00385; B60H 1/00392; B60H 1/22; B60H 1/0057; B60H 1/00028; B60H 1/00042; B60H 2001/00135; B60H 2001/00178
See application file for complete search history.

(56) References Cited

U.S. PATENT DOCUMENTS 5,390,508 A * 2/1995 Benedict ......................... 62/325
5,505,251 A * 4/1996 Sarbach ....................... 165/202
5,598,887 A * 2/1997 Ikeda et al. .................... 165/202

(Continued)

FOREIGN PATENT DOCUMENTS

JP    3-295714    12/1991
JP    5-155236    6/1993

(Continued)

*Primary Examiner* — Mohammad M Ali
*Assistant Examiner* — Christopher R Zerphey
(74) *Attorney, Agent, or Firm* — Hamre, Schumann, Mueller & Larson, P.C.

(57) ABSTRACT

A vehicle air conditioner (1A) includes: an external air introduction port (33) for introducing external air into a vehicle interior; and a duct (3) having an inlet port (31) for drawing internal air into the duct and an outlet port (32) for blowing air into the vehicle interior. In the duct (3), a first indoor heat exchanger (12A) and a second indoor heat exchanger (12B) of a heat pump circuit (2A) are disposed. The first indoor heat exchanger (12A) contributes mainly to heating, and the second indoor heat exchanger (12B) contributes mainly to cooling. The duct (3) is provided with at least one of a heating exhaust port (34) for discharging air cooled in the second indoor heat exchanger (12B) to the outside of the vehicle interior in heating operation and a cooling exhaust port (35) for discharging air heated in the first indoor heat exchanger (12A) to the outside of the vehicle interior in cooling operation. With the above configuration, energy required for adjustment of the temperature of air in the vehicle interior can be efficiently used without waste.

13 Claims, 6 Drawing Sheets

(51) Int. Cl.
*F25B 13/00* (2006.01)
*F25B 41/04* (2006.01)

(52) U.S. Cl.
CPC ....... *F25B 41/04* (2013.01); *F25B 2313/02741* (2013.01); *F25B 2341/0662* (2013.01)

(56) References Cited

U.S. PATENT DOCUMENTS 5,975,191 A * 11/1999 Ohashi et al. ................... 165/43
2013/0306302 A1 * 11/2013 Osaka et al. ................... 165/287
2014/0075973 A1 * 3/2014 Graaf et al. ..................... 62/115
2015/0082820 A1 * 3/2015 Takahashi .................... 62/238.7

FOREIGN PATENT DOCUMENTS

| | | |
|---|---|---|
| JP | 5-221229 | 8/1993 |
| JP | 8-091042 | 4/1996 |
| JP | 8-238919 | 9/1996 |
| JP | 3433297 | 5/2003 |
| JP | 2003-291625 | 10/2003 |

* cited by examiner

AIR CONDITIONING DEVICE FOR VEHICLE

TECHNICAL FIELD

The present invention relates to vehicle air conditioners for cooling and heating vehicle interiors.

BACKGROUND ART

Conventionally, for example, in an automobile equipped with a gasoline engine, a heat pump is used for cooling, while engine waste heat is used for heating. In recent years, hybrid automobiles in which the amount of engine waste heat is small, and electric automobiles in which engine waste heat cannot be used, have become increasingly widespread. Accordingly, vehicle air conditioners using a heat pump not only for cooling but also for heating have been developed. For example, Patent Literature 1 discloses a vehicle air conditioner 100 as shown in FIG. 6A.

The vehicle air conditioner 100 includes a heat pump circuit 110 through which a refrigerant flows only in one direction. The heat pump circuit 110 includes a compressor 121, a first indoor heat exchanger 131, a first expansion valve 122, an outdoor heat exchanger 133, a second expansion valve 123, and a second indoor heat exchanger 132. These devices are connected in this order by flow paths. In addition, the heat pump circuit 110 is provided with a shortcut path bypassing the first expansion valve 122, and a shortcut path bypassing the second expansion valve 123. These shortcut paths are provided with a first on-off valve 141 and a second on-off valve 142, respectively.

The first indoor heat exchanger 131 and the second indoor heat exchanger 132 are disposed in a duct 150 for selectively flowing internal air or external air. The internal air or the external air is drawn into the duct 150 from one end closer to the second indoor heat exchanger 132 by an air blower which is not shown. The internal air or the external air is blown into the vehicle interior from the other end closer to the first indoor heat exchanger 131. That is, the second indoor heat exchanger 132 is located on the windward side with respect to the first indoor heat exchanger 131.

In the duct 150, as shown in FIG. 6B, a first damper 161 is provided on the windward side with respect to the second indoor heat exchanger 132, and a second damper 162 is provided on the windward side with respect to the first indoor heat exchanger 131.

In the cooling operation of the vehicle air conditioner 100 having the above configuration, the first on-off valve 141 is opened, and the second on-off valve 142 is closed. In addition, the first damper 161 and the second damper 162 are set at positions shown by solid lines in FIG. 6B. Therefore, the refrigerant discharged from the compressor 121 flows into the outdoor heat exchanger 133 without releasing heat in the first indoor heat exchanger 131, releases heat in the outdoor heat exchanger 133, and is then expanded by the second expansion valve 123. The expanded refrigerant absorbs heat in the second indoor heat exchanger 132, and is then drawn into the compressor 121.

On the other hand, in the heating operation, the first on-off valve 141 is closed, and the second on-off valve 142 is opened. In addition, the first damper 161 and the second damper 162 are set at positions shown by chain double-dashed lines in FIG. 6B. Therefore, the refrigerant discharged from the compressor 121 releases heat in the first indoor heat exchanger 131, and is expanded by the first expansion valve 122. The expanded refrigerant flows into the outdoor heat exchanger 133, absorbs heat in the outdoor heat exchanger 133, and is then drawn into the compressor 121 without further absorbing heat in the second indoor heat exchanger 132.

CITATION LIST

Patent Literature

Patent Literature 1: JP Patent No. 3433297

SUMMARY OF INVENTION

Technical Problem

When external air is drawn into the duct 150, that is, when the external air is introduced into the vehicle interior thorough the duct 150, the same amount of internal air (air in the vehicle interior) as the introduced external air needs to be discharged to the outside. However, when the internal air whose temperature has been adjusted by heating or cooling is discharged directly to the outside, the energy required for adjusting the temperature of the internal air is wasted.

In view of such circumstances, the present invention aims to provide a vehicle air conditioner that can efficiently use energy.

Solution to Problem

In order to solve the above problem, the present invention provides a vehicle air conditioner that cools and heats a vehicle interior, the vehicle air conditioner including: an external air introduction port for introducing external air into the vehicle interior; a duct having an inlet port for drawing internal air of the vehicle interior into the duct, and an outlet port for blowing air into the vehicle interior; an air blower that generates an air flow from the inlet port to the outlet port in the duct; and a heat pump circuit including a first indoor heat exchanger that is disposed in the duct and contributes mainly to heating, a second indoor heat exchanger that is disposed in the duct and contributes mainly to cooling, and an outdoor heat exchanger that is disposed outside the vehicle interior, functions as an evaporator in heating operation, and functions as a condenser in cooling operation. The duct is provided with at least one of a heating exhaust port for discharging air cooled in the second indoor heat exchanger to the outside of the vehicle interior in the heating operation, and a cooling exhaust port for discharging air heated in the first indoor heat exchanger to the outside of the vehicle interior in the cooling operation.

Advantageous Effects of Invention

According to the above configuration, in the case where the heating exhaust port is provided, heat removal from internal air having been heated by heating can be allowed to take place in the second indoor heat exchanger in the course of discharge of the internal air to the outside. On the other hand, in the case where the cooling exhaust port is provided, heat supply to internal air having been cooled by cooling can be allowed to take place in the first indoor heat exchanger in the course of discharge of the internal air to the outside. That is, in either case, energy can be efficiently used by effectively utilizing the internal air to be discharged to the outside.

DESCRIPTION OF EMBODIMENTS

Hereinafter, embodiments of the present invention will be described with reference to the drawings. The following description relates to examples of the present invention, and the present invention is not limited by the examples.

(First Embodiment)

Figure 1:
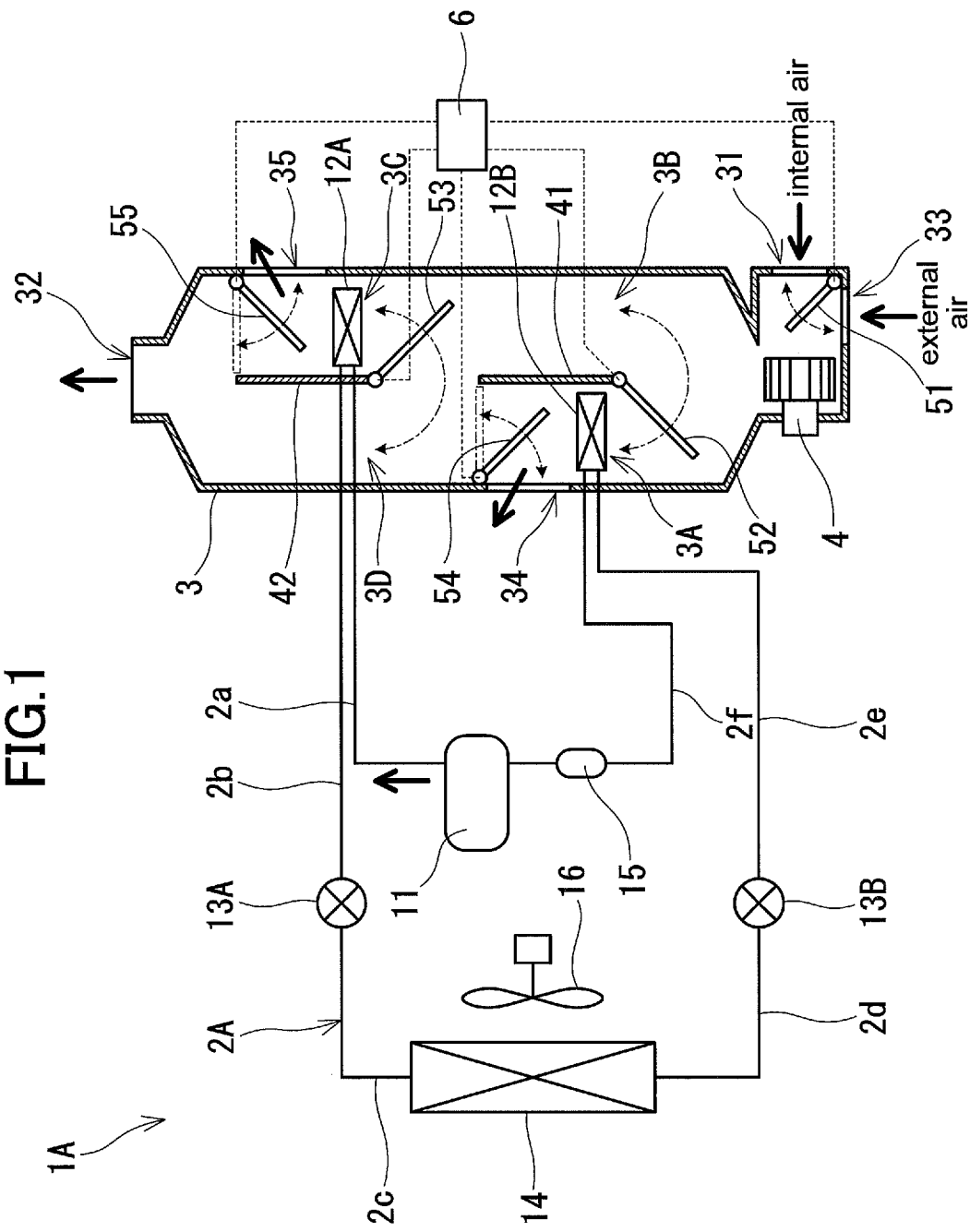
FIG. 1 is a configuration diagram of a vehicle air conditioner according to a first embodiment of the present invention.

FIG. 1 is a configuration diagram of a vehicle air conditioner 1A according to a first embodiment of the present invention. The vehicle air conditioner 1A cools and heats a vehicle interior which is not shown, and includes a controller 6 and a heat pump circuit 2A in which a refrigerant is circulated. As the refrigerant, R134a, R410A, HFO-1234yf, HFO-1234ze, $CO_2$, or the like can be used. In addition, other HFC refrigerants, other HC refrigerants, or the like, can also be used.

The heat pump circuit 2A includes a compressor 11, a first indoor heat exchanger 12A, a first expansion valve 13A, an outdoor heat exchanger 14, a second expansion valve 13B, and a second indoor heat exchanger 12B. These devices (11, 12A, 13A, 14, 13B, 12B) are connected in this order in a loop by first to sixth flow paths 2a to 2f.

The compressor 11 is driven by an electric motor which is not shown. The compressor 11 compresses the refrigerant drawn through a suction port, and discharges the refrigerant through a discharge port. The electric motor may be disposed inside the compressor 11 or may be disposed outside the compressor 11. The discharge port of the compressor 11 is connected to the first indoor heat exchanger 12A via the first flow path 2a.

The first indoor heat exchanger 12A contributes mainly to heating, and is disposed in the duct 3. The duct 3 has an inlet port 31 for drawing internal air of the vehicle interior into the duct 3, and has an outlet port 32 for blowing air into the vehicle interior. In addition, a blower 4 serving as the air blower of the present invention is provided in the duct 3 in the vicinity of the inlet port 31. The blower 4 generates an air flow from the inlet port 31 to the outlet port 32 in the duct 3. The air blower of the present invention is not limited to the blower 4, and may be a fan. When a fan is used, the fan can be disposed in the vicinity of the outlet port 32.

In the present embodiment, an external air introduction port 33 for introducing external air into the vehicle interior is provided in the duct 3, and the external air is introduced into the vehicle interior through the duct 3.

Furthermore, an intake damper 51 is provided in the duct 3, and adjusts the ratio between the amount of external air drawn into the duct 3 through the external air introduction port 33 and the amount of internal air drawn into the duct 3 through the inlet port 31. The first indoor heat exchanger 12A performs heat exchange between the refrigerant and internal air and/or external air supplied by the blower 4. In the present embodiment, the first indoor heat exchanger 12A functions as a condenser both in the cooling operation and in the heating operation. The first indoor heat exchanger 12A is connected to the first expansion valve 13A via the second flow path 2b.

In the cooling operation, the first expansion valve 13A allows the refrigerant to pass therethrough without expanding the refrigerant, while in the heating operation, the first expansion valve 13A expands the refrigerant. The first expansion valve 13A is connected to the outdoor heat exchanger 14 via the third flow path 2c.

The outdoor heat exchanger 14 is disposed outside the vehicle interior (e.g., in a front portion of an automobile), and performs heat exchange between the refrigerant and external air supplied by travel of the vehicle and by the fan 16.

The outdoor heat exchanger 14 functions as a condenser in the cooling operation, and functions as an evaporator in the heating operation. The outdoor heat exchanger 14 is connected to the second expansion valve 13B via the fourth flow path 2d.

In the cooling operation, the second expansion valve 13B expands the refrigerant, while in the heating operation, the second expansion valve 13B allows the refrigerant to pass therethrough without expanding the refrigerant. The second expansion valve 13B is connected to the second indoor heat exchanger 12B via the fifth flow path 2e.

The second indoor heat exchanger 12B contributes mainly to cooling, is disposed in the duct 3, and performs heat exchange between the refrigerant and internal air and/or external air supplied by the blower 4. In the present embodiment, the second indoor heat exchanger 12B is located on the windward side in the duct 3 with respect to the first indoor heat exchanger 12A. The second indoor heat exchanger 12B functions as an evaporator both in the cooling operation and in the heating operation. The second indoor heat exchanger 12B is connected to the suction port of the compressor 11 via the sixth flow path 2f. The sixth flow path 2f is provided with an accumulator 15.

Next, the internal configuration of the duct 3 will be described in detail. In FIG. 1, that portion of the duct 3 which houses the first indoor heat exchanger 12A and the second indoor heat exchanger 12B is schematically shown in the shape of a cylinder having a constant cross-sectional area. However, the actual shape of the duct 3 may be such that a portion of the duct 3 is expanded or undulated in conformity with a space in which the duct 3 is placed. In addition, the outlet port 32 described above may be branched into a plurality of ports such as a defroster blowing port, a face blowing port, and a foot blowing port.

In the present embodiment, the second indoor heat exchanger 12B is disposed in such a manner that a first flow path 3A passing through the second indoor heat exchanger 12B and a second flow path 3B not passing through the second indoor heat exchanger 12B form separate layers in the duct 3. Similarly, the first indoor heat exchanger 12A is disposed in such a manner that a third flow path 3C passing through the first indoor heat exchanger 12A and a fourth flow path 3D not passing through the first indoor heat exchanger 12A form separate layers in the duct 3. In addition, a first partition plate 41 separating between the first flow path 3A and the second flow path 3B, and a second partition plate 42 separating between the third flow path 3C and the fourth flow path 3D, are provided in the duct 3. The second indoor heat exchanger 12B and the first indoor heat exchanger 12A are located on opposite sides with respect to the first partition plate 41 and the second partition plate 42 in such a manner that the first flow path 3A is continuous with the fourth flow path 3D, and the second flow path 3B is continuous with the third flow path 3C.

Figure 2:
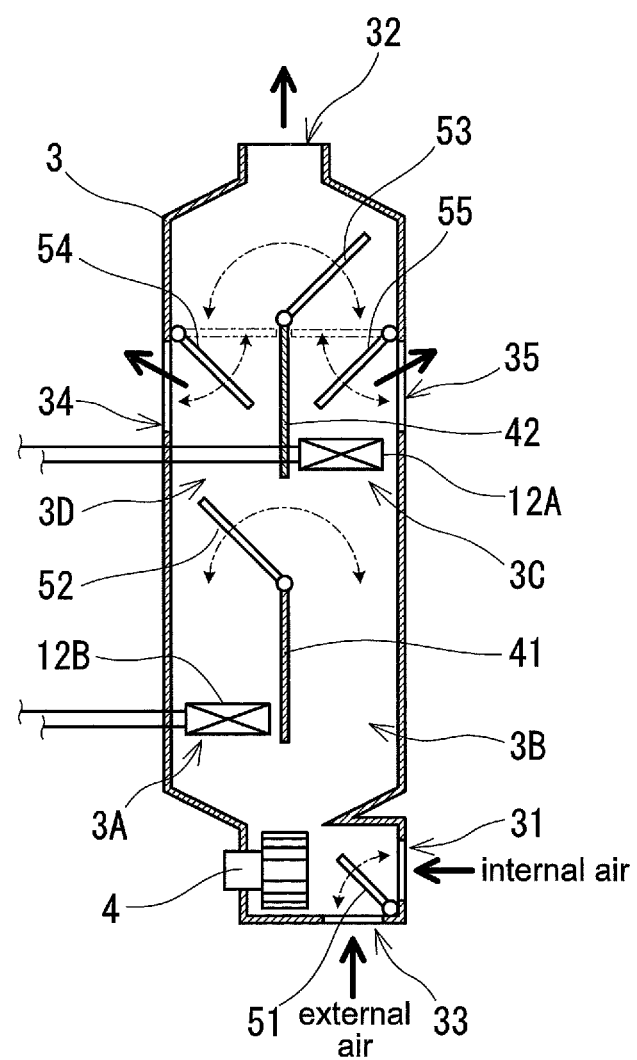
FIG. 2 is a diagram showing another example of the configuration of a duct.

Furthermore, a first adjustment damper 52 that adjusts the ratio between the amount of air flowing in the first flow path 3A and the amount of air flowing in the second flow path 3B, and a second adjustment damper 53 that adjusts the ratio between the amount of air flowing in the third flow path 3C and the amount of air flowing in the fourth flow path 3D, are provided in the duct 3. In the present embodiment, the second adjustment damper 53 is disposed between the first partition plate 41 and the second partition plate 42, and the first adjustment damper 52 is disposed on the windward side with respect to the first partition plate 41. However, as shown in FIG. 2, the first adjustment damper 52 may be disposed between the first partition plate 41 and the second partition plate 42, and the second adjustment damper 53 may be disposed on the leeward side with respect to the second partition plate 42. When the second adjustment damper 53 (the first adjustment damper 52 in the case of FIG. 2) disposed between the first partition plate 41 and the second partition plate 42 is situated on a line connecting the leeward end of the first partition plate 41 to the windward end of the second partition plate 42, the second adjustment damper 53 prevents mixing of air having passed through the first flow path 3A and air having passed through the second flow path 3B.

Hereinafter, for simplification of description, positions of the first adjustment damper 52 are defined as follows: a position for blocking the second flow path 3B is referred to as a bypass-side blocking position; a position for blocking the first flow path 3A is referred to as a heat exchanger-side blocking position; a position for making the amount of air flowing in the first flow path 3A equal to the amount of air flowing in the second flow path 3B is referred to as an intermediate position; a position between the intermediate position and the bypass-side blocking position is referred to as a bypass-side reducing position; and a position between the intermediate position and the heat exchanger-side blocking position is referred to as a heat exchanger-side reducing position. On the other hand, positions of the second adjustment damper 53 are defined as follows: a position for blocking the fourth flow path 3D is referred to as a bypass-side blocking position; a position for blocking the third flow path 3C is referred to as a heat exchanger-side blocking position; a position at which the second adjustment damper 53 is situated on the line connecting the leeward end of the first partition plate 41 to the windward end of the second partition plate 42, is referred to as an intermediate position; a position between the intermediate position and the bypass-side blocking position is referred to as a bypass-side reducing position; and a position between the intermediate position and the heat exchanger-side blocking position is referred to as a heat exchanger-side reducing position.

In addition, in the duct 3, a heating exhaust port 34 is provided on the leeward side with respect to the second indoor heat exchanger 12B, and a cooling exhaust port 35 is provided on the leeward side with respect to the first indoor heat exchanger 12A. The heating exhaust port 34 is intended to discharge air cooled in the second indoor heat exchanger 12B to the outside of the vehicle interior in the heating operation, and the cooling exhaust port 35 is intended to discharge air heated in the first indoor heat exchanger 12A to the outside of the vehicle interior in the cooling operation.

In the present embodiment, the heating exhaust port 34 is placed facing the first partition plate 41 so as to open into the first flow path 3A, and the cooling exhaust port 35 is placed facing the second partition plate 42 so as to open into the third flow path 3C. However, since the first flow path 3A is continuous with the fourth flow path 3D, the heating exhaust port 34 may be placed facing the second partition plate 42 so as to open into the fourth flow path 3D, as shown in FIG. 2.

Furthermore, the duct 3 is equipped with a heating discharge damper 54 that opens and closes the heating exhaust port 34, and with a cooling discharge damper 55 that opens and closes the cooling exhaust port 35.

The heating discharge damper 54 has a swing axis on the leeward side with respect to the heating exhaust port 34, and swings inwardly in the duct 3 from a closing position for closing the heating exhaust port 34, thereby opening the heating exhaust port 34. That is, when the heating discharge damper 54 has opened the heating exhaust port 34, the heating discharge damper 54 directs air having passed through the second indoor heat exchanger 12B to the heating exhaust port 34. When the heating exhaust port 34 is opened, the heating discharge damper 54 can be stopped at an arbitrary position by a servo motor which is not shown.

In the present embodiment, the heating discharge damper 54 is swingable between the closing position for closing the heating exhaust port 34 and a blocking position (a position shown by a chain double-dashed line in FIG. 1) at which one end of the heating discharge damper 54 is close to or in contact with the first partition plate 41 so that the first flow path 3A is blocked. However, as shown in FIG. 2, in the case where the heating exhaust port 34 is placed facing the second partition plate 42, the heating discharge damper 54 may be swingable between the closing position for closing the heating exhaust port 34 and a blocking position at which one end of the heating discharge damper 54 is close to or in contact with the second partition plate 42 so that the fourth flow path 3D is blocked.

The cooling discharge damper 55 has a swing axis on the leeward side with respect to the cooling exhaust port 35, and swings inwardly in the duct 3 from a closing position for closing the cooling exhaust port 35, thereby opening the cooling exhaust port 35. That is, when the cooling discharge damper 55 has opened the cooling exhaust port 35, the cooling discharge damper 55 directs air having passed through the first indoor heat exchanger 12A to the cooling exhaust port 35. When the cooling exhaust port 35 is opened, the cooling discharge damper 55 can be stopped at an arbitrary position by a servo motor which is not shown.

In the present embodiment, the cooling discharge damper 55 is swingable between the closing position for closing the cooling exhaust port 35 and a blocking position (a position shown by a chain double-dashed line in FIG. 1) at which one end of the cooling discharge damper 55 is close to or in contact with the second partition plate 42 so that the third flow path 3C is blocked.

The compressor 11, the first expansion valve 13A, the second expansion valve 13B, and the various dampers 51 to 55, which have been described above, are controlled by the controller 6. The controller 6 is connected to an operating panel (not shown) disposed in the vehicle interior, and performs cooling operation and heating operation. Hereinafter, the operation of the vehicle air conditioner 1A in the cooling operation and in the heating operation will be described. As a typical example, the following describes a case where the vehicle interior is ventilated.

<Cooling Operation>

In the cooling operation, first, the controller 6 opens the first expansion valve 13A fully, and sets the opening degree of the second expansion valve 13B to a predetermined level. In addition, the controller 6 sets the first adjustment damper 52 at the bypass-side reducing position, thereby making the amount of air flowing in the first flow path 3A larger than the amount of air flowing in the second flow path 3B. At this time, the second adjustment damper 53 is set, for example, at the intermediate position. Accordingly, the refrigerant discharged from the compressor 11 releases heat in the first indoor heat exchanger 12A and the outdoor heat exchanger 14, is reduced in pressure in the second expansion valve 13B, and then absorbs heat in the second indoor heat exchanger 12B.

Furthermore, in the duct 3, the intake damper 51 is controlled so that a sufficient amount of external air for ventilation is drawn into the duct 3 through the external air introduction port 33, and the heating discharge damper 54 is set at the closing position for closing the heating exhaust port 34. Meanwhile, the cooling discharge damper 55 is set, for example, at the blocking position for blocking the third flow path 3C, and the cooling exhaust port 35 is opened. Accordingly, internal air drawn through the inlet port 31 and external air drawn through the external air introduction port 33 are mixed with each other to form a mixed air, and a large portion of the mixed air is cooled in the second indoor heat exchanger 12B, and is then blown into the vehicle interior through the outlet port 32. The remaining mixed air cools the refrigerant and is thus heated in the first indoor heat exchanger 12A, and is then discharged to the outside of the vehicle interior through the cooling exhaust port 35.

The flow rate of the air discharged to the outside of the vehicle interior through the cooling exhaust port 35 is preferably equal to or less than the flow rate of the external air drawn through the external air introduction port 33. In order to achieve such a condition, the rate of flow into the third flow path 3C may be regulated by at least one of the first adjustment damper 52 and the second adjustment damper 53 in a state where the cooling discharge damper 55 is set at the blocking position. This allows all of the air having passed through the first indoor heat exchanger 12A to be discharged to the outside. Alternatively, the amount of air directed to the cooling exhaust port 35 may be regulated by the cooling discharge damper 55 in a state where both the first adjustment damper 52 and the second adjustment damper 53 are set at desired positions. This allows part of the air having passed through the first indoor heat exchanger 12A to be discharged to the outside. In this case, the second adjustment damper 53 may be located on an extension of the first partition plate 41(intermediate position), and the flow rates of air flowing in the first flow path 3A and air flowing in the second flow path 3B may be adjusted by the first adjustment damper 52.

It should be understood that in the case where external air is not introduced into the vehicle interior, such as when ventilation is temporarily stopped at startup of the air conditioner for improvement in temperature characteristics or when ventilation is not needed during parking, the cooling discharge damper 55 may be set at the closing position, the first adjustment damper 52 may be set at the bypass-side blocking position, and the second adjustment damper 53 may be set at the heat exchanger-side blocking position.

<Heating Operation>

In the heating operation, first, the controller 6 opens the second expansion valve 13B fully, and sets the opening degree of the first expansion valve 13A to a predetermined level. In addition, the controller 6 sets the first adjustment damper 52 at the heat exchanger-side reducing position, thereby making the amount of air flowing in the second flow path 3B larger than the amount of air flowing in the first flow path 3A. At this time, the second adjustment damper 53 is set, for example, at the intermediate position. Accordingly, the refrigerant discharged from the compressor 11 releases heat in the first indoor heat exchanger 12A, is reduced in pressure in the first expansion valve 13A, and then absorbs heat in the outdoor heat exchanger 14 and the second indoor heat exchanger 12B.

Furthermore, in the duct 3, the intake damper 51 is controlled so that a sufficient amount of external air for ventilation is drawn into the duct 3 through the external air introduction port 33, and the cooling discharge damper 55 is set at the closing position for closing the cooling exhaust port 35. Meanwhile, the heating discharge damper 54 is set, for example, at the blocking position for blocking the first flow path 3A, and the heating exhaust port 34 is opened. Accordingly, internal air drawn through the inlet port 31 and external air drawn through the external air introduction port 33 are mixed with each other to form a mixed air, and a large portion of the mixed air is heated in the first indoor heat exchanger 12A, and is then blown into the vehicle interior through the outlet port 32. The remaining mixed air heats the refrigerant and is thus cooled in the second indoor heat exchanger 12B, and is then discharged to the outside of the vehicle interior through the heating exhaust port 34.

The flow rate of the air discharged to the outside of the vehicle interior through the heating exhaust port 34 is preferably equal to or less than the flow rate of the external air drawn through the external air introduction port 33. In order to achieve such a condition, the rate of flow into the first flow path 3A may be regulated by the first adjustment damper 52 in a state where the heating discharge damper 54 is set at the blocking position. This allows all of the air having passed through the second indoor heat exchanger 12B to be discharged to the outside.

Alternatively, the amount of air directed to the heating exhaust port 34 may be regulated by the heating discharge damper 54 in a state where the first adjustment damper 52 is set at a desired position. This allows part of the air having passed through the second indoor heat exchanger 12B to be discharged to the outside.

It should be understood that in the case where external air is not introduced into the vehicle interior, the heating discharge damper 54 may be set at the closing position, the first adjustment damper 52 may be set at the heat exchanger-side blocking position, and the second adjustment damper 53 may be set at the bypass-side blocking position.

As described above, in the cooling operation, heat supply to internal air having been cooled by cooling can be allowed to take place in the first indoor heat exchanger 12A in the course of discharge of the internal air to the outside. On the other hand, in the heating operation, heat removal from internal air having been heated by heating can be allowed to take place in the second indoor heat exchanger 12B in the course of discharge of the internal air to the outside. That is, in either operation, energy can be efficiently used by effectively utilizing the internal air to be discharged to the outside.

In addition, in the configuration of the present embodiment, part of the external air drawn into the duct 3 is also discharged to the outside. For the external air to be discharged, the first indoor heat exchanger 12A in the cooling operation or the second indoor heat exchanger 12B in the heating operation can be allowed to function as a heat exchanger subsidiary to the outdoor heat exchanger 14.

Furthermore, when external air accounts for 100% of the air drawn into the duct 3, the first indoor heat exchanger 12A in the cooling operation or the second indoor heat exchanger 12B in the heating operation can be allowed to function as an additional outdoor heat exchanger. In other words, two outdoor heat exchangers can be used. Therefore, the efficiency of the vehicle air conditioner 1A can be improved. More specifically, the performance and efficiency in the heating operation can be expected to be improved by heat absorption in the outdoor heat exchanger 14 and the second heat exchanger 12B, and the performance and efficiency in the cooling operation can be expected to be improved by heat release in the outdoor heat exchanger 14 and the first heat exchanger 12A. In addition, the indoor evaporator not required in the heating operation can be effectively used for improvement in heating performance, and the indoor condenser not required in the cooling operation can be effectively used for improvement in cooling performance. In this case, the same amount of internal air as the external air introduced into the vehicle interior through the duct 3 is discharged to the outside through an exhaust port provided in a rear portion of the vehicle or through gaps between the members constituting the vehicle interior. In addition, when both external air and internal air are drawn into the duct 3, both the effect of improving heating or cooling performance and the above-described effect of recovering energy can be obtained.

<Modification>

In the above embodiment, the sizes of the first indoor heat exchanger 12A and the second indoor heat exchanger 12B are smaller than the cross-sectional areas of those portions of the duct 3 in which the heat exchangers 12A and 12B are disposed. However, the present invention is not limited to such a configuration.

Figure 3:
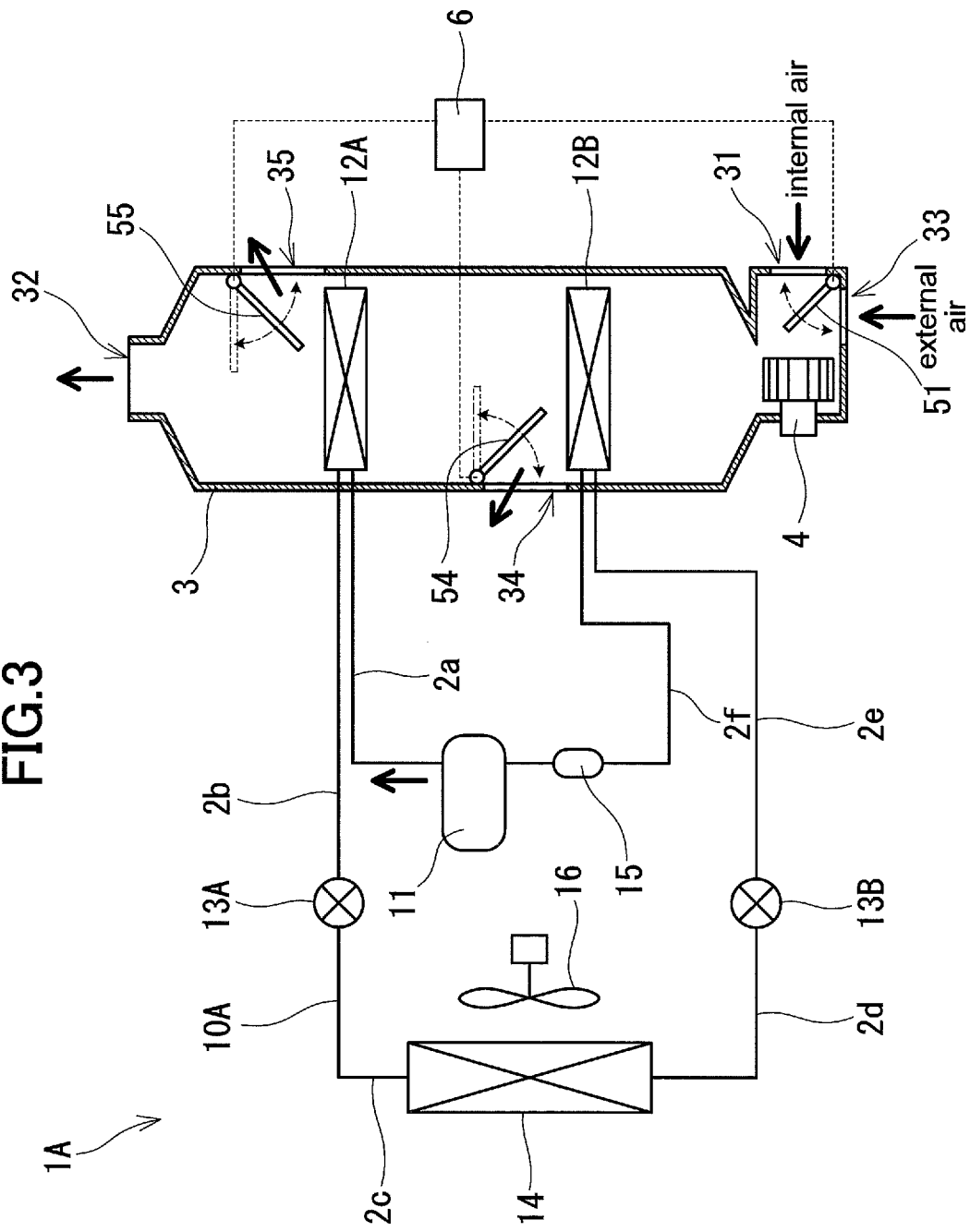
FIG. 3 is a configuration diagram of a vehicle air conditioner according to a modification of the first embodiment.

For example, as shown in FIG. 3, both or either one of the first indoor heat exchanger 12A and the second indoor heat exchanger 12B may have a size approximately equal to the cross-sectional area of that portion of the duct 3 in which the heat exchanger is disposed.

In addition, each of the dampers 51 to 55 need not be driven individually by a single motor, and some of the dampers may be driven by a common motor using a link mechanism or the like.

Furthermore, in the above embodiment, the two adjustment dampers 52 and 53 are provided in the duct 3. However, the functions of the two adjustment dampers 52 and 53 can also be exerted by a single adjustment damper disposed between the first partition plate 41 and the second partition plate 42.

In addition, although swingable plate-shaped dampers are shown as examples in the drawings, it is also possible to use sliding doors or film doors to open and close the heating exhaust port 34 and the cooling exhaust port 35.

(Second Embodiment)

Figure 4:
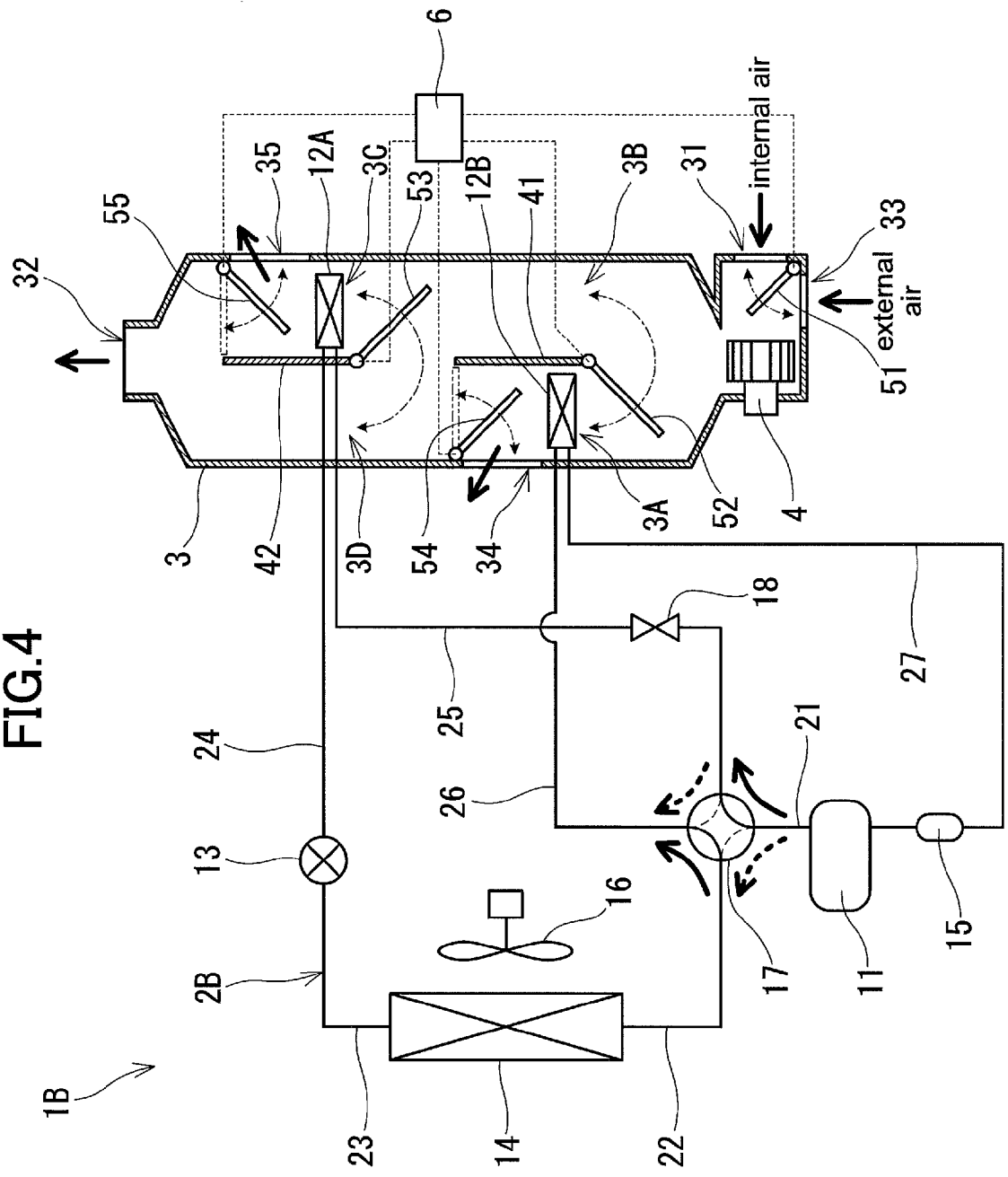
FIG. 4 is a configuration diagram of a vehicle air conditioner according to a second embodiment of the present invention.

FIG. 4 is a configuration diagram of a vehicle air conditioner 1B according to a second embodiment of the present invention. In the present embodiment, the same components as those of the first embodiment are denoted by the same reference numerals, and the description thereof is omitted.

The vehicle air conditioner 1B of the present embodiment includes a heat pump circuit 2B in which the flow direction of the refrigerant can be switched. The heat pump circuit 2B includes the compressor 11, a four-way valve 17, the first indoor heat exchanger 12A, an expansion valve 13, the outdoor heat exchanger 14, and the second indoor heat exchanger 12B. These devices are connected by first to seventh flow paths 21 to 27.

Specifically, the discharge port of the compressor 11 is connected to a first port of the four-way valve 17 via the first flow path 21. A second port of the four-way valve 17 is connected to the outdoor heat exchanger 14 via the second flow path 22, and a third port of the four-way valve 17 is connected to the first indoor heat exchanger 12A via the fifth flow path 25. The outdoor heat exchanger 14 and the first indoor heat exchanger 12A are connected to the expansion valve 13 via the third flow path 23 and the fourth flow path 24, respectively. A fourth port of the four-way valve 17 is connected to the second indoor heat exchanger 12B via the sixth flow path 26, and the second indoor heat exchanger 12B is connected to the suction port of the compressor 11 via the seventh flow path 27. The seventh flow path 27 is provided with the accumulator 15.

The expansion valve 13 is intended to expand the refrigerant, and is an example of an expansion mechanism of the present invention. For example, a positive-displacement expander that recovers power from the refrigerant being expanded can be employed as the expansion mechanism of the present invention.

The four-way valve 17 functions as a switching means of the present invention. In the cooling operation, the four-way valve 17 switches the flow direction of the refrigerant in the heat pump circuit 2B to a first direction indicated by a dashed arrow, while in the heating operation, the four-way valve 17 switches the flow direction to a second direction indicated by a solid arrow. The first direction is a direction in which the refrigerant discharged from the compressor 11 passes though the outdoor heat exchanger 14, the expansion valve 13, the first indoor heat exchanger 12A, and the second indoor heat exchanger 12B in this order to return to the compressor 11. The second direction is a direction in which the refrigerant discharged from the compressor 11 passes through the first indoor heat exchanger 12A, the expansion valve 13, the outdoor heat exchanger 14, and the second indoor heat exchanger 12B in this order to return to the compressor 11.

Furthermore, in the present embodiment, the fifth flow path 25 between the first indoor heat exchanger 12A and the four-way valve 17 is provided with an auxiliary pressure-reducing mechanism 18 whose state can be switched by the controller 6 between an on-state in which the auxiliary pressure-reducing mechanism 18 allows the refrigerant to pass therethrough without reducing the pressure of the refrigerant and an off-state in which the auxiliary pressure-reducing mechanism 18 reduces the pressure of the refrigerant. Specifically, the auxiliary pressure-reducing mechanism 18 is controlled to be in the off-state in the heating operation and in the normal cooling operation, and is controlled to be in the on-state in a particular type of cooling operation, namely, energy recovering cooling operation for recovering energy from the internal air to be discharged to the outside. When the auxiliary pressure-reducing mechanism 18 is controlled to be in the on-state, the opening degree of the expansion valve 13 is set to a relatively high level. Accordingly, the first indoor heat exchanger 12A, which functions as an evaporator in the normal cooling operation, functions as a condenser in the energy recovering cooling operation. In the heating operation, the first indoor heat exchanger 12A functions as a condenser. The second indoor heat exchanger 12B functions as an evaporator both in the cooling operation and in the heating operation, as in the first embodiment.

The control of the various dampers 51 to 55 which is performed in the energy recovering cooling operation and the heating operation in the present embodiment is the same as the control described in the first embodiment for the cooling operation and the heating operation. Therefore, the description of the control is omitted.

Also in the present embodiment, the same effect as that in the first embodiment can be obtained.

<Modification>

Figure 5A:
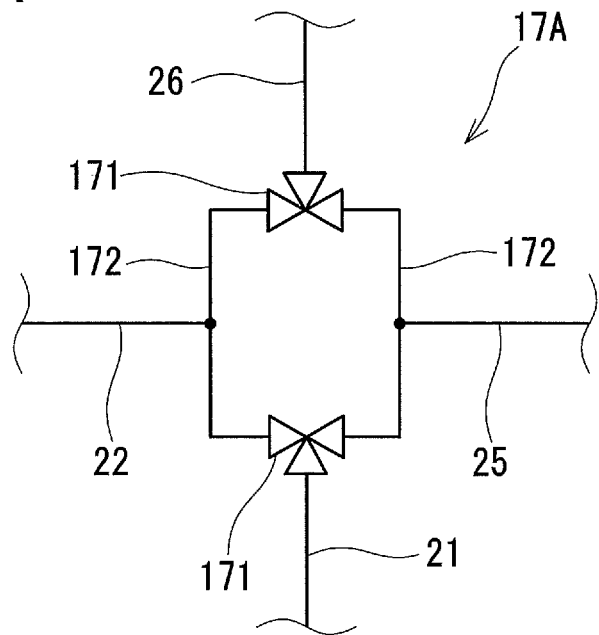
FIG. 5A and FIG. 5B are configuration diagrams of alternative examples of switching means.
Figure 5B:
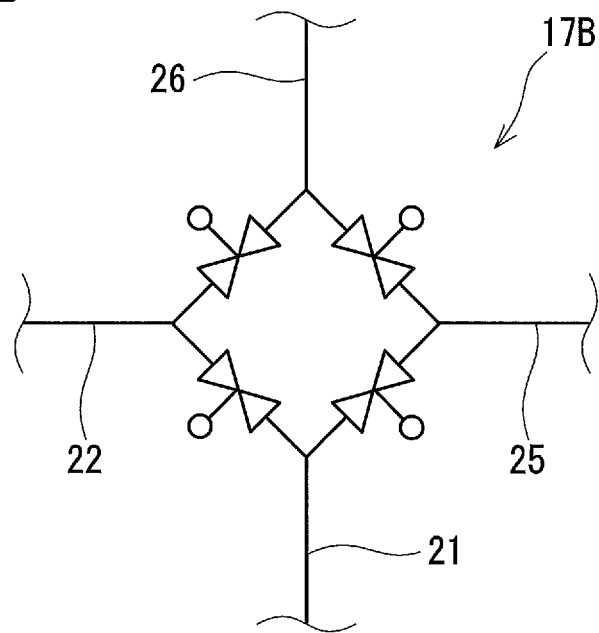
Figure 6A:
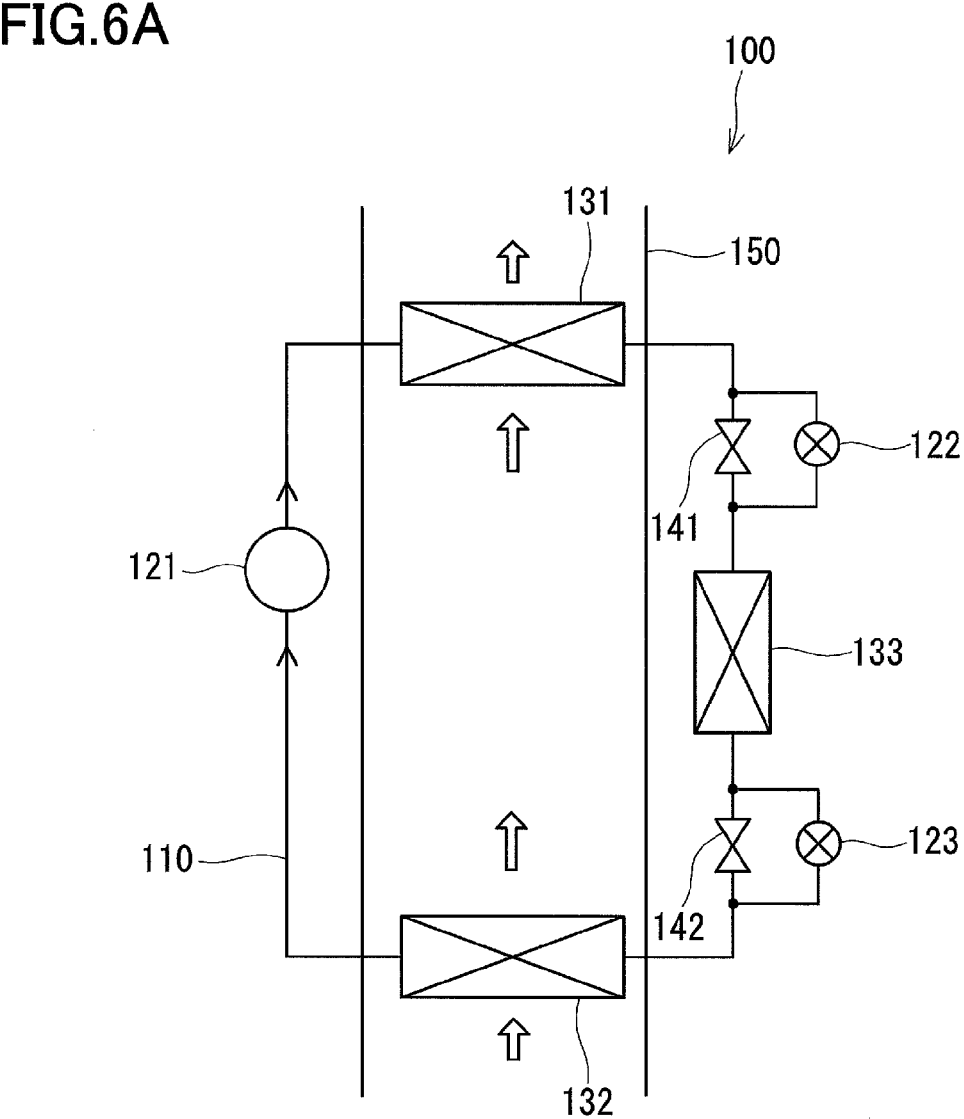
FIG. 6A is a configuration diagram of a conventional vehicle air conditioner.
Figure 6B:
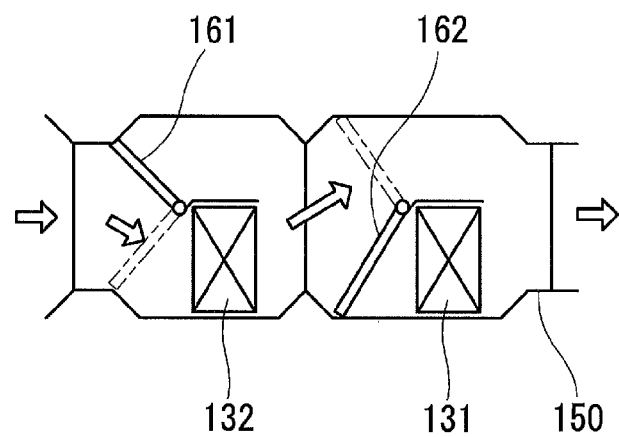
FIG. 6B is a diagram illustrating dampers used in the vehicle air conditioner.

In the above embodiment, the four-way valve 17 is used as the switching means. However, the switching means of the present invention is not limited thereto. For example, the switching means may be a circuit 17A as shown in FIG. 5A, where two three-way valves 171 respectively connected to the first flow path 21 and the sixth flow path 26 are connected in a loop by a pair of pipes 172, and the second flow path 22 and the fifth flow path 25 are respectively connected to the pipes 172. Alternatively, the switching means may be a so-called bridge circuit 17B as shown in FIG. 5B.

In addition, the auxiliary pressure-reducing mechanism 18 need not necessarily be provided in the heat pump circuit 2B. In the case where the auxiliary pressure-reducing mechanism 18 is not provided, the first indoor heat exchanger 12A functions only as an evaporator both in the cooling operation and in the heating operation. That is, air is not heated in the first indoor heat exchanger 12A in the cooling operation, and therefore, the cooling exhaust port 35 and the damper for cooling 55 may be omitted. In this case, air flowing in the duct 3 in the cooling operation is cooled both in the second indoor heat exchanger 12B and in the first indoor heat exchanger 12A. Therefore, the first indoor heat exchanger 12A, which contributes mainly to heating, contributes also to cooling.

(Other Embodiments)

In the first and second embodiments, both the heating exhaust port 34 and the cooling exhaust port 35 are provided in the duct 3. However, it is sufficient that at least one of the heating exhaust port 34 and the cooling exhaust port 35 be provided in the duct 3. For example, the vehicle air conditioner of the present invention may be configured to have only the heating exhaust port 34 and thus to improve only the heating performance.

In addition, in the above embodiments, the external air introduction port 33 is provided in the duct 3. However, the external air introduction port 33 may be provided in a member defining the vehicle interior so as to allow external air to be introduced directly into the vehicle interior.

Furthermore, the second indoor heat exchanger 12B need not necessarily be located on the windward side in the duct 3 with respect to the first indoor heat exchanger 12A, and the positions of the heat exchangers may be reversed.

However, when the second indoor heat exchanger 12B is located on the windward side with respect to the first indoor heat exchanger 12A, air flowing in the duct 3 in the heating operation can be dehumidified in the second indoor heat exchanger 12B before the air is heated in the first indoor heat exchanger 12A.

INDUSTRIAL APPLICABILITY

The vehicle air conditioner of the present invention can perform cooling and heating with efficient use of energy, and is therefore useful particularly for non-combustion type automobiles such as electric automobiles and fuel cell automobiles.

The invention claimed is:

1. A vehicle air conditioner that cools and heats a vehicle interior, the vehicle air conditioner comprising:
    an external air introduction port for introducing external air into the vehicle interior;
    a duct having an inlet port for drawing internal air of the vehicle interior into the duct, and an outlet port for blowing air into the vehicle interior;
    an air blower that generates an air flow from the inlet port to the outlet port in the duct; and
    a heat pump circuit comprising:
        a compressor that compresses a refrigerant,
        a first indoor heat exchanger that is disposed in the duct and contributes mainly to heating,
        a second indoor heat exchanger that is disposed in the duct, and contributes mainly to cooling, and
        an outdoor heat exchanger that is disposed outside the vehicle interior, the outdoor heat exchanger functioning as an evaporator that allows the refrigerant flowing in the outdoor heat exchanger to evaporate in heating operation, the refrigerant flowing from the compressor to the first indoor heat exchanger and from the first indoor heat exchanger to the outdoor heat exchanger before returning to the compressor during the heating operation, the outdoor heat exchanger functioning as a condenser that allows the refrigerant flowing in the outdoor heat exchanger to condense in cooling operation,
    wherein the duct is provided with at least one of a heating exhaust port for discharging air cooled in the second indoor heat exchanger to the outside of the vehicle interior in the heating operation, and a cooling exhaust port for discharging air heated in the first indoor heat exchanger to the outside of the vehicle interior in the cooling operation,
    the second indoor heat exchanger is located on a windward side in the duct with respect to the first indoor heat exchanger,
    the first indoor heat exchanger is disposed in the duct in such a manner that a first flow path passing through the first indoor heat exchanger and a second flow path not passing through the first indoor heat exchanger are formed,
    a first adjustment damper is provided in the duct and adjusts a ratio between an amount of air flowing in the first flow path and an amount of air flowing in the second flow path,
    the first adjustment damper is provided so as to be selectively operable to block the first flow path or to block the second flow path,
    the heat pump circuit further comprises: a first expansion valve that expands the refrigerant in the heating operation and a second expansion valve that expands the refrigerant in the cooling operation,
    the compressor, the first indoor heat exchanger, the first expansion valve, the outdoor heat exchanger, the second expansion valve, and the second indoor heat exchanger are serially connected in this order in a loop by flow paths,
    the refrigerant flows from the compressor to the first indoor heat exchanger, flows from the first indoor heat exchanger to the first expansion valve, flows from the first expansion valve to the outdoor heat exchanger, flows from the outdoor heat exchanger to the second expansion valve, and flows from the second expansion valve to the second indoor heat exchanger.

2. The vehicle air conditioner according to claim 1, wherein the duct is provided with both the heating exhaust port and the cooling exhaust port.

3. The vehicle air conditioner according to claim 1, further comprising a heating discharge damper that opens and closes the heating exhaust port, wherein
    the heating discharge damper directs air having passed through the second indoor heat exchanger to the heating exhaust port when the heating discharge damper has opened the heating exhaust port.

4. The vehicle air conditioner according to claim 1, further comprising a cooling discharge damper that opens and closes the cooling exhaust port, wherein
    the cooling discharge damper directs air having passed through the first indoor heat exchanger to the cooling exhaust port when the cooling discharge damper has opened the cooling exhaust port.

5. The vehicle air conditioner according to claim 1, further comprising:
a first partition plate provided in the duct so as to separate between a third flow path passing through the second indoor heat exchanger and a fourth flow path not passing through the second indoor heat exchanger; and
a second partition plate provided in the duct so as to separate between the first flow path and the second flow path, wherein
the first indoor heat exchanger and the second indoor heat exchanger are located on opposite sides with respect to the first partition plate and the second partition plate in such a manner that the third flow path is continuous with the second flow path, and the fourth flow path is continuous with the first flow path, and
the first adjustment damper is provided between the first partition plate and the second partition plate so as to be selectively operable to block the first flow path, block the second flow path, or prevent mixing of air having passed through the third flow path and air having passed through the fourth flow path.

6. The vehicle air conditioner according to claim 5, further comprising a second adjustment damper that is provided in the duct and adjusts a ratio between an amount of air flowing in the third flow path and an amount of air flowing in the fourth flow path, wherein
the second adjustment damper is located on a windward side in the duct with respect to the second indoor heat exchanger.

7. The vehicle air conditioner according to claim 1, wherein
the external air introduction port is provided in the duct, and
the vehicle air conditioner further comprises an intake damper that adjusts a ratio between an amount of external air drawn into the duct through the external air introduction port and an amount of internal air drawn into the duct through the inlet port.

8. The vehicle air conditioner according to claim 6, further comprising a controller that controls the second adjustment damper so that a flow rate of the air discharged to the outside of the vehicle interior through the heating exhaust port is equal to or less than a flow rate of the external air drawn through the external air introduction port.

9. The vehicle air conditioner according to claim 6, further comprising a heating discharge damper that opens and closes the heating exhaust port, wherein
the heating discharge damper directs air having passed through the second indoor heat exchanger to the heating exhaust port when the heating discharge damper has opened the heating exhaust port.

10. The vehicle air conditioner according to claim 9, further comprising a controller that controls the heating discharge damper so that a flow rate of the air discharged to the outside of the vehicle interior through the heating exhaust port is equal to or less than a flow rate of the external air drawn through the external air introduction port.

11. A method of controlling a vehicle air conditioner that cools and heats a vehicle interior, wherein the vehicle air conditioner includes:
an external air introduction port for introducing external air into the vehicle interior;
a duct having an inlet port for drawing internal air of the vehicle interior into the duct, and an outlet port for blowing air into the vehicle interior;
an air blower that generates an air flow from the inlet port to the outlet port in the duct;
a heat pump circuit including:
a compressor that compresses a refrigerant,
a first indoor heat exchanger that is disposed in the duct and contributes mainly to heating,
a second indoor heat exchanger that is disposed in the duct, and contributes mainly to cooling, and
an outdoor heat exchanger that is disposed outside the vehicle interior, the outdoor heat exchanger functioning as an evaporator that allows the refrigerant flowing in the outdoor heat exchanger to evaporate in heating operation, the refrigerant flowing from the compressor to the first indoor heat exchanger and from the first indoor heat exchanger to the outdoor heat exchanger before returning to the compressor during the heating operation, the outdoor heat exchanger functioning as a condenser that allows the refrigerant flowing in the outdoor heat exchanger to condense in cooling operation,
a first partition plate provided in the duct so as to separate between a third flow path passing through the second indoor heat exchanger and a fourth flow path not passing through the second indoor heat exchanger;
a second partition plate provided in the duct so as to separate between the first flow path and the second flow path;
a first adjustment damper that is provided in the duct and adjusts a ratio between an amount of air flowing in the first flow path and an amount of air flowing in the second flow path; and
a second adjustment damper that is provided in the duct and adjusts a ratio between an amount of air flowing in the third flow path and an amount of air flowing in the fourth flow path,
wherein the duct is provided with at least one of a heating exhaust port for discharging air cooled in the second indoor heat exchanger to the outside of the vehicle interior in the heating operation, and a cooling exhaust port for discharging air heated in the first indoor heat exchanger to the outside of the vehicle interior in the cooling operation,
the second indoor heat exchanger is located on a windward side in the duct with respect to the first indoor heat exchanger,
the first indoor heat exchanger is disposed in the duct in such a manner that a first flow path passing through the first indoor heat exchanger and a second flow path not passing through the first indoor heat exchanger are formed,
the first adjustment damper is provided so as to be selectively operable to block the first flow path or to block the second flow path,
the heat pump circuit further includes: a first expansion valve that expands the refrigerant in the heating operation and a second expansion valve that expands the refrigerant in the cooling operation,
the compressor, the first indoor heat exchanger, the first expansion valve, the outdoor heat exchanger, the second expansion valve, and the second indoor heat exchanger are serially connected in this order in a loop by flow paths,
the refrigerant flows from the compressor to the first indoor heat exchanger, flows from the first indoor heat exchanger to the first expansion valve, flows from the first expansion valve to the outdoor heat exchanger, flows from the outdoor heat exchanger to the second expansion valve, and flows from the second expansion valve to the second indoor heat exchanger, the first indoor heat exchanger and the second indoor heat exchanger are located on opposite sides with respect to the first partition plate and the second partition plate in such a manner that the third flow path is continuous with the second flow path, and the fourth flow path is continuous with the first flow path, the first adjustment damper is provided between the first partition plate and the second partition plate so as to be selectively operable to block the first flow path, block the second flow path, or prevent mixing of air having passed through the third flow path and air having passed through the fourth flow path, and the second adjustment damper is located on a windward side in the duct with respect to the second indoor heat exchanger, and wherein the method comprises:

controlling the second adjustment damper so that a flow rate of the air discharged to the outside of the vehicle interior through the heating exhaust port is equal to or less than a flow rate of the external air drawn through the external air introduction port.

12. A method of controlling a vehicle air conditioner that cools and heats a vehicle interior, wherein the vehicle air conditioner includes:

an external air introduction port for introducing external air into the vehicle interior;

a duct having an inlet port for drawing internal air of the vehicle interior into the duct, and an outlet port for blowing air into the vehicle interior;

an air blower that generates an air flow from the inlet port to the outlet port in the duct;

a heat pump circuit including:
  a compressor that compresses a refrigerant,
  a first indoor heat exchanger that is disposed in the duct and contributes mainly to heating,
  a second indoor heat exchanger that is disposed in the duct, and contributes mainly to cooling, and
  an outdoor heat exchanger that is disposed outside the vehicle interior, the outdoor heat exchanger functioning as an evaporator that allows the refrigerant flowing in the outdoor heat exchanger to evaporate in heating operation, the refrigerant flowing from the compressor to the first indoor heat exchanger and from the first indoor heat exchanger to the outdoor heat exchanger before returning to the compressor during the heating operation, the outdoor heat exchanger functioning as a condenser that allows the refrigerant flowing in the outdoor heat exchanger to condense in cooling operation, a first partition plate provided in the duct so as to separate between a third flow path passing through the second indoor heat exchanger and a fourth flow path not passing through the second indoor heat exchanger;

a second partition plate provided in the duct so as to separate between the first flow path and the second flow path;

a first adjustment damper that is provided in the duct and adjusts a ratio between an amount of air flowing in the first flow path and an amount of air flowing in the second flow path;

a second adjustment damper that is provided in the duct and adjusts a ratio between an amount of air flowing in the third flow path and an amount of air flowing in the fourth flow path; and a heating discharge damper that opens and closes the heating exhaust port, wherein the duct is provided with at least one of a heating exhaust port for discharging air cooled in the second indoor heat exchanger to the outside of the vehicle interior in the heating operation, and a cooling exhaust port for discharging air heated in the first indoor heat exchanger to the outside of the vehicle interior in the cooling operation, the second indoor heat exchanger is located on a windward side in the duct with respect to the first indoor heat exchanger, the first indoor heat exchanger is disposed in the duct in such a manner that a first flow path passing through the first indoor heat exchanger and a second flow path not passing through the first indoor heat exchanger are formed, the first adjustment damper is provided so as to be selectively operable to block the first flow path or to block the second flow path, the heat pump circuit further includes: a first expansion valve that expands the refrigerant in the heating operation and a second expansion valve that expands the refrigerant in the cooling operation, the compressor, the first indoor heat exchanger, the first expansion valve, the outdoor heat exchanger, the second expansion valve, and the second indoor heat exchanger are serially connected in this order in a loop by flow paths, the refrigerant flows from the compressor to the first indoor heat exchanger, flows from the first indoor heat exchanger to the first expansion valve, flows from the first expansion valve to the outdoor heat exchanger, flows from the outdoor heat exchanger to the second expansion valve, and flows from the second expansion valve to the second indoor heat exchanger, the first indoor heat exchanger and the second indoor heat exchanger are located on opposite sides with respect to the first partition plate and the second partition plate in such a manner that the third flow path is continuous with the second flow path, and the fourth flow path is continuous with the first flow path, the first adjustment damper is provided between the first partition plate and the second partition plate so as to be selectively operable to block the first flow path, block the second flow path, or prevent mixing of air having passed through the third flow path and air having passed through the fourth flow path, the second adjustment damper is located on a windward side in the duct with respect to the second indoor heat exchanger, and the heating discharge damper directs air having passed through the second indoor heat exchanger to the heating exhaust port when the heating discharge damper has opened the heating exhaust port, and wherein the method comprises:

controlling the heating discharge damper so that a flow rate of the air discharged to the outside of the vehicle interior through the heating exhaust port is equal to or less than a flow rate of the external air drawn through the external air introduction port.

13. A vehicle air conditioner that cools and heats a vehicle interior, the vehicle air conditioner comprising:

an external air introduction port for introducing external air into the vehicle interior;

a duct having an inlet port for drawing internal air of the vehicle interior into the duct, and an outlet port for blowing air into the vehicle interior;

an air blower that generates an air flow from the inlet port to the outlet port in the duct; and a heat pump circuit comprising:
- a compressor that compresses a refrigerant,
- a first indoor heat exchanger that is disposed in the duct and contributes mainly to heating,
- a second indoor heat exchanger that is disposed in the duct and contributes mainly to cooling, and
- an outdoor heat exchanger that is disposed outside the vehicle interior, the outdoor heat exchanger functioning as an evaporator that allows the refrigerant flowing in the outdoor heat exchanger to evaporate in a heating operation, the outdoor heat exchanger functioning as a condenser that allows refrigerant flowing in the outdoor heat exchanger to condense in a cooling operation, wherein the duct is provided with at least one of a heating exhaust port for discharging air cooled in the second indoor heat exchanger to the outside of the vehicle interior in the heating operation and a cooling exhaust port for discharging air heated in the first indoor heat exchanger to the outside of the vehicle interior in the cooling operation, the first indoor heat exchanger is disposed in the duct in such a manner that a first flow path passing through the first indoor heat exchanger and a second flow path not passing through the first indoor heat exchanger are formed, a first adjustment damper is provided in the duct and adjusts a ratio between an amount of air flowing in the first flow path and an amount of air flowing in the second flow path, the first adjustment damper is provided so as to be selectively operable to block the first flow path or block the second flow path, the heat pump circuit further comprises an expansion mechanism that expands the refrigerant, the vehicle air conditioner further comprises a switching valve that switches a flow direction of the refrigerant in the heat pump circuit to a first direction in the cooling operation and that switches the flow direction to a second direction in the heating operation, the first direction being a direction in which the refrigerant discharged from the compressor passes serially through the outdoor heat exchanger, the expansion mechanism, the first indoor heat exchanger, and the second indoor heat exchanger in this order to return to the compressor, and the second direction being a direction in which the refrigerant discharged from the compressor passes serially through the first indoor heat exchanger, the expansion mechanism, the outdoor heat exchanger, and the second indoor heat exchanger in this order to return to the compressor.

* * * * *